United States Patent
Bosch et al.

(10) Patent No.: US 8,089,938 B2
(45) Date of Patent: Jan. 3, 2012

(54) METHOD OF SYNCHRONIZING WITH AN UPLINK CHANNEL AND A METHOD OF DETERMINING A PROPAGATION DELAY IN A WIRELESS COMMUNICATIONS SYSTEM

(75) Inventors: Peter Bosch, New Providence, NJ (US); Emad N. Farag, Flanders, NJ (US); Sape J. Mullender, North Plainfield, NJ (US); Alexander Nathues, Bavaria (DE); Louis Gwyn Samuel, Swindon (GB)

(73) Assignee: Alcatel Lucent, Paris (FR)

( * ) Notice: Subject to any disclaimer, the term of this patent is extended or adjusted under 35 U.S.C. 154(b) by 1052 days.

(21) Appl. No.: 11/318,467

(22) Filed: Dec. 28, 2005

(65) Prior Publication Data
US 2007/0147337 A1 Jun. 28, 2007

(51) Int. Cl.
*H04W 4/00* (2009.01)
*H04B 15/00* (2006.01)
(52) U.S. Cl. ........ 370/332; 370/331; 370/328; 370/330; 455/502
(58) Field of Classification Search ................... 370/332
See application file for complete search history.

(56) References Cited

U.S. PATENT DOCUMENTS

| 5,828,659 | A * | 10/1998 | Teder et al. | 370/328 |
| 7,295,531 | B2 * | 11/2007 | Wheatley et al. | 370/328 |
| 7,447,179 | B2 * | 11/2008 | Lu | 370/335 |
| 2002/0051431 | A1 * | 5/2002 | Choi et al. | 370/331 |

FOREIGN PATENT DOCUMENTS

| CN | 1112385 | 11/1995 |
| EP | 1401225 | 3/2004 |
| WO | WO 02/47422 | 6/2002 |

OTHER PUBLICATIONS

International Search Report and Written Opinion (dated May 22, 2007).
Office Action for corresponding Chinese Application No. 200680049338.X dated Dec. 31, 2010 and English Translation thereof.

* cited by examiner

*Primary Examiner* — Lester Kincaid
*Assistant Examiner* — Andy Gu
(74) *Attorney, Agent, or Firm* — Harness, Dickey & Pierce

(57) ABSTRACT

A method of synchronizing with an uplink channel and a method of determining a propagation delay in a wireless communications system are provided. In the example method of synchronizing, a propagation delay between a target base station and a mobile station is calculated. Then, the calculated propagation delay is sent to the target base station. In the example method of determining a propagation delay, a first signal is received indicating a first measured chip offset between a downlink channel of a serving base station and a pilot signal of the target base station. A second signal indicating a second measured chip offset between an uplink channel of the mobile station and a pilot signal of the target base station is then received. A propagation delay between the target base station and the mobile station is calculated based at least in part on the first and second measured chip offsets.

20 Claims, 2 Drawing Sheets

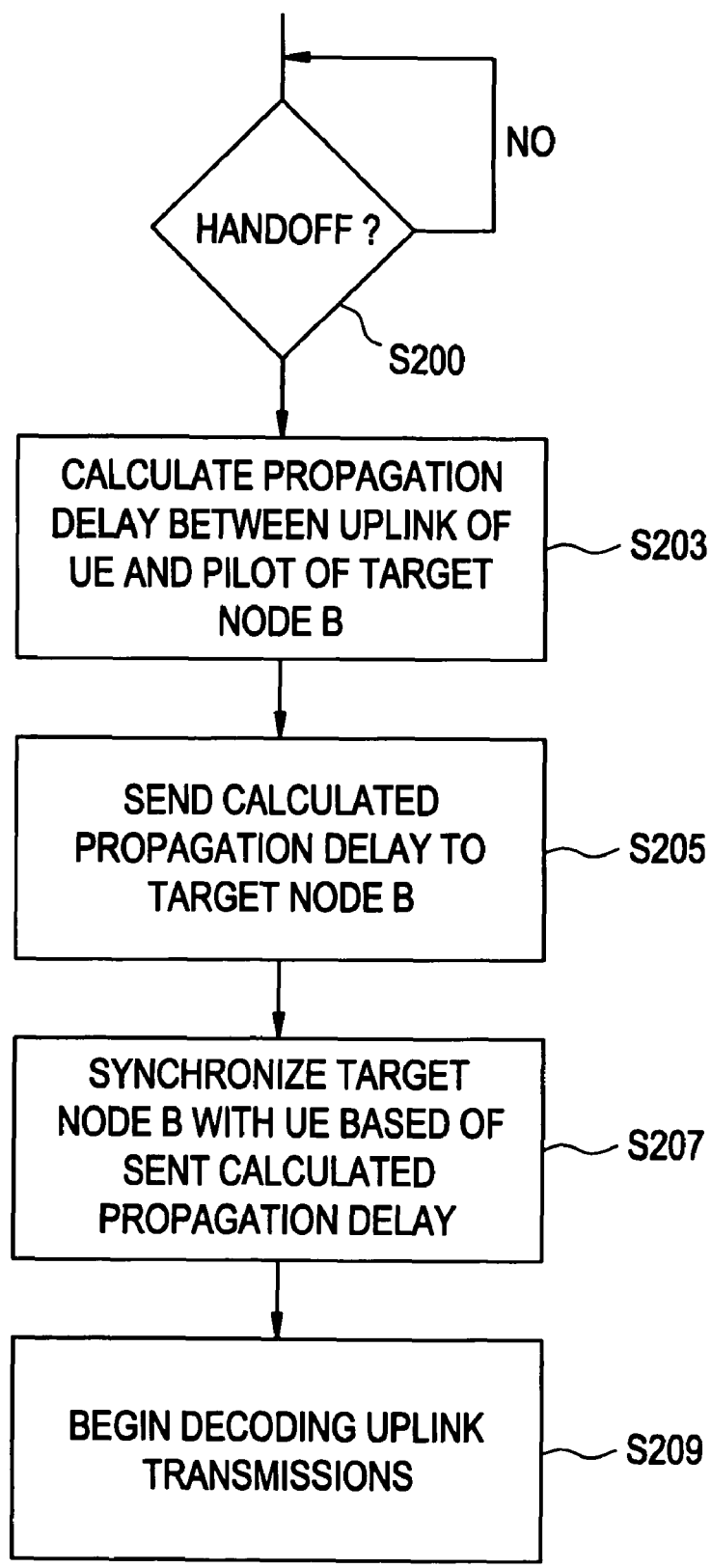

METHOD OF SYNCHRONIZING WITH AN UPLINK CHANNEL AND A METHOD OF DETERMINING A PROPAGATION DELAY IN A WIRELESS COMMUNICATIONS SYSTEM

BACKGROUND OF THE INVENTION

1. Field of the Invention

The present invention relates generally to a method of synchronizing with an uplink channel and a method of determining a propagation delay in a wireless communications system.

2. Description of the Related Art

A cellular communications network typically includes a variety of communication nodes coupled by wireless or wired connections and accessed through different types of communications channels. Each of the communication nodes includes a respective protocol stack that processes the data respectively transmitted and received over the communications channels. Depending on the type of communications system, the operation and configuration of the various communication nodes can differ and are often referred to by different names. Such communications systems include, for example, a Code Division Multiple Access 2000 (CDMA2000) system and Universal Mobile Telecommunications System (UMTS).

UMTS is a wireless data communication and telephony standard which describes a set of protocol standards. UMTS sets forth the protocol standards for the transmission of voice and data between a base station (BS) or Node B and a mobile or user equipment (UE). UMTS systems typically include multiple radio network controllers (RNCs). The RNC in UMTS networks provides functions equivalent to the base station controller (BSC) functions in GSM/GPRS networks. However, RNCs may have further capabilities including, for example, autonomously managing handovers without involving mobile switching centers (MSCs) and serving general packet radio service (GPRS) support nodes (SGSNs). The Node B is responsible for air interface processing and some radio resource management functions. The Node B in UMTS networks provides functions equivalent to the base transceiver station (BTS) in GSM/GPRS networks. Node Bs are typically physically co-located with an existing GSM base transceiver station (BTS) to reduce the cost of UMTS implementation and minimize planning consent restrictions.

FIG. 1 illustrates a conventional communication system 100 operating in accordance with UMTS protocols. Referring to FIG. 1, the communication system 100 may include a number of Node Bs such as Node Bs 120, 122 and 124, each serving the communication needs of UEs such as UEs 105 and 110 in their respective coverage area. The Node Bs are connected to an RNC such as RNCs 130 and 132, and the RNCs are connected to a MSC/SGSN 140. The RNC handles certain call and data handling functions, such as, as discussed above, autonomously managing handovers without involving MSCs and SGSNs. The MSC/SGSN 140 handles routing calls and/or data to other elements (e.g., RNCs 130/132 and Node Bs 120/122/124) in the network or to an external network. Further illustrated in FIG. 1 are conventional interfaces Uu, Iub, Iur and Iu between these elements.

The conventional communication system 100 may employ two mechanisms for mobility between Node Bs 120/122/124; namely, a soft handover approach and a hard handover approach. In soft handoff, multiple legs or radio channels (e.g., communication links between a mobile station and multiple Node Bs) are used to transfer digital messages from the communication system 100 to the UE (e.g., UE 105). The UE 105 combines the analog data received from the multiple legs into a single analog waveform before attempting to decode the message. Conversely, when transmitting to the communication system 100, the UE 105 transmits in soft-handover mode to multiple base stations, each of which decodes the message independently and forwards the decoded message to an RNC (e.g., RNC 130). The RNC 130 selects one of the forwarded messages as being representative of the data message sent by the UE 105.

Legs are added to a UE 105's active set whenever the pilot strength of a particular base station is received by the UE 105 with a signal-to-noise ratio (SNR) above a threshold level. A leg may be added to the active set even though the channel itself may not yet be strong enough to support data transmission. However, time consuming synchronization procedures are performed before the channel may be used for data transmission. Namely, in soft handoff, timings between each of the base stations in the active set are synchronized with each other. Such synchronization introduces transmission latency.

More recently, a base station router (BSR) or integrated base station has been adopted. A BSR collapses, among other functions, the functionality of a RNC and a base station (or Node B) into a single processing entity, thereby reducing latency (e.g., because the Iu interface is eliminated). BSRs are, for example, described in U.S. patent application Ser. Nos. 11,094,436 and 11,094,430, each filed on Mar. 31, 2005. Since latency is greatly reduced with the BSR structure, BSRs often employ hard handoff as opposed to the above described soft handoff approach.

The hard-handover procedure is a break-before-make mobility procedure in terms of the radio channel used by the UE. In hard handoff, as a mobile station or UE moves throughout the communication system 100 and within the serving areas of different Node Bs, only one connection between the UE and a respective Node B is active at any particular time because a current channel is discarded before a new channel is established. However, radio outages occur during the time period starting from when the current channel is dropped until the new channel is established.

In the communication system 100, a hard-handover procedure typically involves sending a layer-3 control message to a UE indicating the channel parameters for the new channel. The layer-3 control message may contain one or more of a downlink channelization codes, a downlink scrambling code, an uplink channelization code and an uplink scrambling code. When the UE (e.g., UE 105) receives the layer-3 control message, the UE 105 ceases communication on the old channel and begins searching for a new downlink channel associated with the new Node B (e.g., Node B 122). Once the UE 105 finds the new downlink channel, the UE 105 transmits to the new Node B 122 in accordance with the channelization parameters indicated by the layer-3 control message.

Within the UMTS standard, the synchronization procedure for the UE to align itself with a new downlink is performed by de-referencing the chip offset from the base station's pilot channel. The layer-3 control message to the UE indicates the chip offset of the new radio channel in terms of chips to the new base station's pilot channel. Each chip represents a portion of an analog wave form, and a UMTS may use, for example, 3.84 million chips per second (Mcps). The communication system 100 thereby informs the mobile or UE at which offset it should look or search for the new downlink. Using this offset information, the mobile is able to more quickly (e.g., within 40 ms) lock onto the new downlink if the new channel can be de-referenced to a known pilot channel, which has already been measured by the mobile. Once locked onto the new downlink, the UE is said to be synchronized.

In UMTS, the uplink chip offset is related to the above-described downlink chip offset. Generally, each radio channel is divided into fixed length time intervals; for example, a Transmission Time Interval (TTI) having 15 slots each with 2560 chips. Each TTI may have a fixed duration (e.g., 10 milliseconds (ms)). An uplink channel's TTI starts 1024 chips after reception by the mobile of a downlink channel's TTI. Additionally, the uplink TTI does not begin until the downlink is synchronized by the mobile. Thus, the uplink TTI begins after the downlink is synchronized.

The base station or Node B analyzes or "searches" uplink transmissions sent by the UE so as to synchronize with the uplink. The propagation delay between the new base station or Node B and the mobile or UE, or vice versa, is typically not known. Before the base station attempts to decode the messages transmitted from the mobile, the base station searches through the received uplink chip space until an uplink pilot and a TTI boundary has been found.

The chip search ranges can be substantial in UMTS systems, and base stations in UMTS systems typically do not include processors fast enough to perform real-time searching. In other words, larger chip search spaces generate a larger lag, which increases the processing time required for the Node B to synchronize with the uplink TTI, and increases radio outage lengths.

Also, the mobile is not informed of when the base station is synchronized with the uplink TTI. Rather, the mobile simply begins transmitting data as soon as it is able without taking the base station's synchronization into account. Thus, data packets transmitted by the mobile may be lost if they arrive at the base station before the base station is synchronized. Transmitted data packets, which are lost during the above-described search procedure, are then retransmitted at a higher protocol layer. This retransmission of lost data packets may cause latency effects in the uplink (e.g., between 120 to 340 ms).

SUMMARY OF THE INVENTION

An example embodiment of the present invention is directed to a method of synchronizing a target base station with a mobile station in a wireless communications system, including calculating a propagation delay between the target base station and the mobile station and sending the calculated propagation delay to the target base station.

Another example embodiment of the present invention is directed to a method of calculating a propagation delay between a target base station and a mobile station in a wireless communications system, including first receiving a first signal indicating a first measured chip offset between a downlink channel of a serving base station and a pilot signal of the target base station, second receiving a second signal indicating a second measured chip offset between an uplink channel of the mobile station and a pilot signal of the target base station and calculating the propagation delay between the target base station and the mobile station based at least in part on the first and second measured chip offsets.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 2 is a flow chart illustrating a process for synchronizing a target Node B with an uplink channel of a mobile station according to an example embodiment of the present invention.

DETAILED DESCRIPTION OF EXAMPLE EMBODIMENTS

Figure 1:
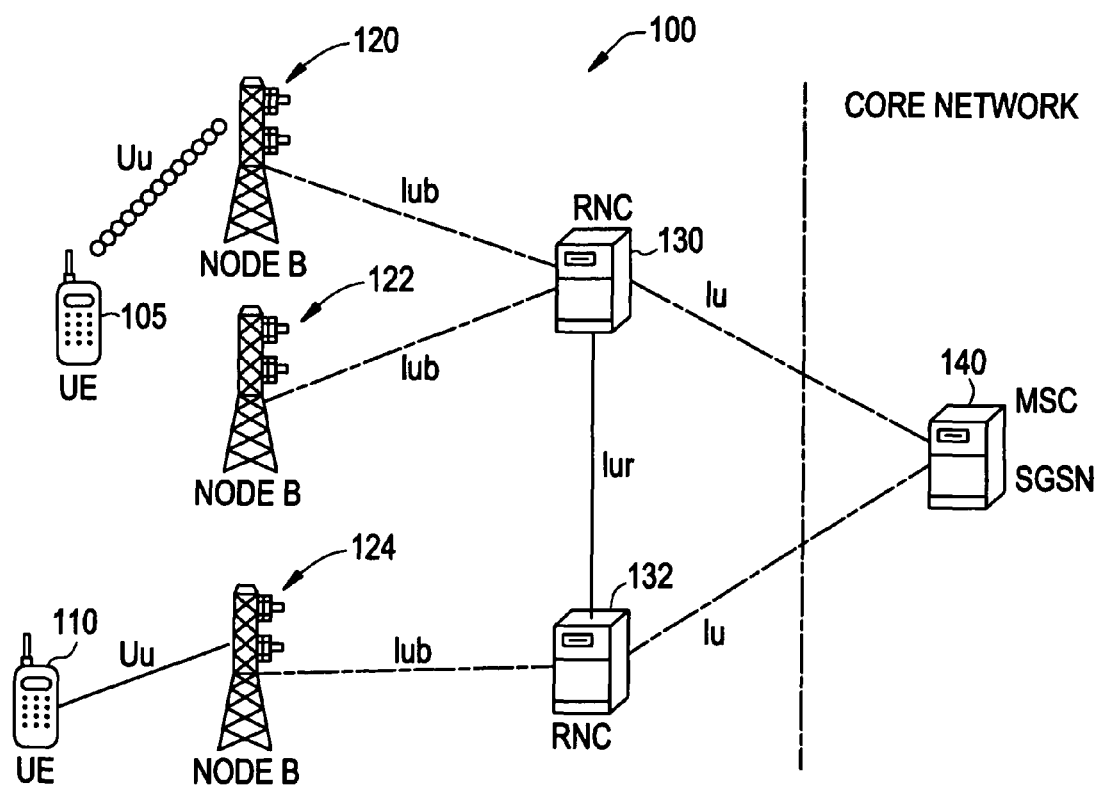
FIG. 1 illustrates a conventional communication system operating in accordance with UMTS protocols.

In order to better understand the present invention, examples will hereinafter be provided with reference to the UMTS communication system 100 of FIG. 1. First, a synchronization process based on a calculated propagation delay will be described, followed by an example calculation of the propagation delay.

FIG. 2 is a flow chart illustrating a process for synchronizing a target Node B with an uplink channel of a mobile station according to an example embodiment of the present invention. In the following description of FIG. 2, with reference to FIG. 1, the UE 105 is assumed to be a mobile station being transferred via a hard handoff from the Node B 120 (e.g., a current serving Node B or base station) to the Node B 122 (e.g., the target Node B). As illustrated in FIG. 1, each of the Node Bs 120 and 122 are in communication with the RNC 130 via the Iub interface.

In step S200, the RNC 130 determines whether to initiate a hard handoff of the mobile station. For example, the RNC 130 may monitor the connection strength between the UE 105 and the current serving Node B 120. If the connection strength between the UE 105 and the current serving Node B 120 drops below a connection strength threshold (e.g., the target Node B 122 is available with a greater connection strength), the process advances to step S203. Otherwise, if no handoff is decided, the process of FIG. 2 remains in step S200 and the UE 105 maintains its connection with the current serving Node B 120.

In step S203, the RNC 130 calculates a propagation delay between the UE 105 and the target Node B 122. An example of performing the propagation delay calculation will be given later in greater detail.

After calculating the propagation delay in step S203, the RNC 130 sends the calculated propagation delay to the target Node B 122 in step S205. The target Node B 122 then uses the received propagation delay to synchronize with the UE 105 in step S207. As discussed in the Background of the Invention section, in a conventional synchronization process the Node B 122 has no knowledge of the propagation delay between the Node B 122 and the UE 105, and as such, must "search" or analyze a large number of chips for establishing synchronization. The Node B 122 is then synchronized with the UE 105 at the start of the new TTI. In contrast, in step S207, the target Node B 122 may configure its rake receivers to hone in on an expected first chip of the next TTI using the calculated propagation delay. This synchronization process will be described in greater detail below after the detailed description of calculating the propagation delay between the UE 105 and the target Node B 122. As will be discussed later with respect to step S207, multiple rake receivers may be spread in a given range in proximity to the expected first chip to compensate for fluctuations between the calculated propagation delay and the actual propagation delay.

Once the target Node B 122 is synchronized with the UE 105, the Node B 122 is prepared for a hard handoff. Upon receipt of instructions from the RNC 130 to initiate a hard handoff of the UE 105 from the current serving Node B 120 to the target Node B 122, the Node B 122 simply begins decoding uplink transmissions from the UE 105 in step S209. Since the target Node B 122 is already synchronized with the uplink, the conventional search procedure need not be performed and the decoding may commence with little to no latency.

EXAMPLE PROPAGATION DELAY CALCULATION

An example of calculating the propagation delay between the UE 105 and the target Node B 122, as described above with respect to step S203 of FIG. 2, will now be described in greater detail.

Under UMTS protocols, the UE 105 periodically transmits a measurement report to the RNC 130 as part of a layer-3 control message. The layer-3 control message indicates each pilot signal which the UE 105 is able to decode, a signal strength associated with each of the pilot signals accessible to the UE 105 and a chip offset indicator indicating a chip offset of the UE 105's data downlink with respect to the accessible pilot signals. Additionally, the current serving Node B 120 is able to calculate the propagation delay between the Node B 120 and the UE 105 by measuring when the uplink arrives at the Node B 120 with respect to downlink transmissions sent by the Node B 120 to the UE 105.

When the RNC 130 informs the target Node B 122 of layer-1 parameters of the "old" uplink between the UE 105 and the current serving Node B 120, the UE 105 is typically about to perform a hard handover to a neighboring base station (e.g., when a connection strength between the UE 105 and the current serving Node B 120 drops below a connection threshold). The target Node B 122 may thereby decode the old uplink and determine the old uplink TTI boundaries and chip offsets. The target Node B 122 can then measure the chip difference between the old uplink and a pilot of the target Node B 122. The measured chip difference is sent to the RNC 130.

As will now be described, the RNC 130 may then calculate the propagation delay between the target Node B and the UE 105 based on the periodic measurement report sent by the UE 105 and the measured chip difference between the old uplink and the pilot of the target Node B 122 sent by the target Node B 122. To explain these calculations, the variables shown in Table 1 (below) will be used.

TABLE 1

| | |
|---|---|
| $U_n$ | Uplink to base station n |
| $D_n$ | Downlink from base station n |
| Pn | Pilot from base station n |
| T(1) | Transmission time of link 1 |
| R(1) | Reception time of link 1 |
| $R_n(1)$ | Reception time of link 1 by base station n |
| $\pi_n$ | Propagation delay to/from base station n |
| $C_n$ | Chip offset of downlink from pilot used by base station n |

In the following example, the base station (n=1) or $B_1$ may refer to the current serving Node B 120 and the base station (n=2) or $B_2$ may refer to the target Node B 122. The RNC 130 assumes the uplink and downlink propagation delay are the same, which may be expressed as $$\pi_n = R(D_n) - T(D_n) \quad \text{Equation 1}$$

$$\pi_n = R(P_n) - T(P_n) \quad \text{Equation 2}$$

$$\pi_n = R(U_n) - T(U_n) \quad \text{Equation 3}$$

The UE 105 maintains connectivity with the current serving Node B 120 or $B_1$ with respect to $P_1$, $D_1$ and $U_1$. The propagation delay value $\pi_1$ is calculated by the base-band coder at the current serving Node B 120 or $B_1$. The chip offset C1 for the current serving Node B 120 is expressed as:

$$C_1 = T(P_1) - T(D_1) \quad \text{Equation 4}$$

For the purposes of this example, it will be assumed that the uplink transmission is offset a fixed 1024 chips from the downlink transmission reception such that the UE 105 transmits 1024 chips after reception of $B_1$'s downlink, which may be expressed as:

$$T(U_1) - R(D_1) = 1024 \quad \text{Equation 5}$$

It may be further assumed that the propagation delay in the downlink equals the propagation delay in the uplink, which, from the perspective of the current serving Node B 120, may be expressed as:

$$R(U_1) - T(D_1) = 2\pi_1 + 1024 \quad \text{Equation 6}$$

The UE 105 periodically reports the difference in chip offsets between the downlink and the pilot of the target Node B 122, which may be expressed as:

$$R(P_2) - R(D_1) = z \quad \text{Equation 7}$$

hence $$R(P_2) - R(P_1) = z - C_1 \quad \text{Equation 8}$$

The measurements expressed above in Equations 7 and 8 are performed by the UE 105. From the perspective of the target Node B 122, the measurements are expressed as:

$$T(P_2) - T(P_1) = z - C_1 + \pi_1 - \pi_2 \quad \text{Equation 9}$$

The current serving Node B 120 or $B_2$ running $D_1$ and $U_1$ knows the propagation delay between the current serving Node B 120 and the UE 105 by performing the calculation of Equation 6. The target Node B 122 may thereby measure the chip difference between the uplink $U_1$ of the current serving Node B 120 and the pilot channel $P_2$ of the target Node B 122, as shown in the following series of equations:

$$T(P_2) - R_2(U_1) = y \quad \text{Equation 10}$$

$$T(P_2) - T(U_1) = y + \pi_2 \quad \text{Equation 11}$$

$$T(P_2) = y + \pi_2 + T(U_1) \quad \text{Equation 12}$$

$$T(P_2) = y - C_1 + \pi_1 - \pi_2 + T(P_1) \quad \text{Equation 13}$$

$$z - C_1 + \pi_1 - \pi_2 + T(P_1) = y + \pi_2 + T(U_1) \quad \text{Equation 14}$$

where $R_2(U_1)$ stands for the target Node B's 122 measurement of the current serving Node B's 120 uplink.

Then, from Equations 1 and 5, the following expression is derived:

$$T(U_1) = \pi_1 + 1024 + T(D_1) \quad \text{Equation 15}$$

This gives:

$$z - C_1 + \pi_1 - \pi_2 + T(P_1) = y + \pi_2 + \pi_1 + 1024 + T(D_1) \quad \text{Equation 16}$$

And, may alternatively be expressed as:

$$z - C_1 + T(P_1) = y + 2\pi_2 + 1024 + T(D_1) \quad \text{Equation 17}$$

Then, Equation 4 is plugged into Equation 17 to achieve:

$$z - C_1 + C_1 + T(D_1) = y + 2\pi_2 + 1024 + T(D_1) \quad \text{Equation 18}$$

This gives:

$$Z = y + 2\pi_2 + 1024 \quad \text{Equation 19}$$

And, may be alternatively expressed as:

$$\Pi_2 = \frac{z - y - 1024}{2} \quad \text{Equation 20}$$

As shown in the above series of Equations, the propagation delay between the target Node B 122 and the UE 105 equals (1) the difference between (i) the measured delta in chip offsets between the downlink $D_2$ and the pilot channel $P_2$ of the target Node B 122 (e.g., z in Equation 7) and (ii) the measured chip difference between the current serving Node B 120's uplink $U_1$ and the pilot channel $P_2$ of the target Node B 122 (e.g., y in Equation 10) minus (2) a fixed offset (e.g., latency (e.g., 1024 chips)), the resultant expression divided by two (2). Therefore, by subtracting the chip offsets and adjusting for differences between uplink and downlink TTIs, the propagation delay between the UE 105 and the target Node B 122 may be determined before the UE 105 switches to the target Node B 122 during a hard handoff. The propagation delay value $\pi_2$ is thereby calculated by the RNC 130 in accordance with Equation 20 in step S203. The RNC 130 in step S205 sends the propagation delay value $\pi_2$ to the target Node B 122 to use in priming the rake fingers and searcher of the Node B 122 before the connection with the UE 105 is established.

EXAMPLE SYNCHRONIZATION

In step S207 the target Node B 122 determines an expected arrival time of a next TTI based on the propagation delay value $\pi_2$. The target Node B 122 then instructs its rake fingers to tune to the expected arrival time of the next TTI. Thereby, when the UE 105 begins transmitting to the target Node B 122, the target Node B 122 is capable of decoding the uplink transmissions without extensive searching to synchronize with the UE 105.

Instead of assigning each rake finger to tune precisely to the chip where the next TTI is expected to begin, the rake fingers may be spread in proximity to the expected arrival time of the next TTI. In an example, the rake fingers may be offset from each other at half chip intervals both later than and earlier than the expected arrival time of the next TTI. The chip interval and the number of rake fingers assigned to the spread may be determined based on an expectation of the accuracy of the calculated propagation delay value $\pi_2$ (e.g., based on an empirical study). Generally, as the expectation of the accuracy of the calculated propagation delay value $\pi_2$ decreases, a greater spread is required, and vice versa.

For example, it is understood that a certain amount of drift may occur and the calculated propagation delay value $\pi_2$ may not be exact when employed by the target Node B. To compensate for such drift, rake fingers at the target Node B 122 may be spread within a given drift threshold of the expected chip arrival time of the uplink. If the drift exceeds the drift threshold compensated for by the spreading of the rake fingers, the conventional full search process may be employed by the target Node B 122, and any lost packets are retransmitted in a conventional fashion at a higher layer protocol. Thus, drift is one reason why the rake fingers may be spread in proximity to the expected arrival time of the next TTI.

Example embodiments of the present invention being thus described, it will be obvious that the same may be varied in many ways. For example, while above-described with respect to UMTS, it is understood that other example embodiments of the present invention may be applied to any wireless communication system operating in accordance with any wireless communication protocol. Likewise, while above-described equations use specific numbers which comply with typical UMTS specifications (e.g., see equations 5, 6, etc.), it is understood that these numbers represented as constants in the above-equations may be adjusted as necessary for compliance with other communication protocols.

Such variations are not to be regarded as a departure from the example embodiments of the invention, and all such modifications are intended to be included within the scope of the invention.

We claim:

1. A method of synchronizing a target base station with a mobile station in a wireless communications system, comprising:
    calculating, by an element on the network side, a propagation delay between the target base station and the mobile station at least partially based on a first measured chip offset between a downlink channel of a serving base station and a pilot signal of the target base station, the downlink channel being between the serving base station and the mobile station, wherein the calculating step calculates the calculated propagation delay based on (i) the first chip offset between the downlink channel and the pilot channel of the target base station and (ii) a second chip offset between an uplink channel of the mobile station and the pilot channel of the target base station; and
    sending, by the element on the network side, the calculated propagation delay to the target base station.

2. The method of claim 1, wherein the calculating step calculates the calculated propagation delay by subtracting the second chip offset and a constant value from the first chip offset and dividing the subtraction result by two.

3. The method of claim 2, wherein the constant value is a set amount of time between a receipt of a downlink transmission and a start of an uplink transmission.

4. The method of claim 1, wherein the first chip offset is received at a radio network controller (RNC) from the mobile station.

5. The method of claim 1, wherein the second chip offset is received at a radio network controller (RNC) from the target base station.

6. The method of claim 1, wherein the sending step is performed before communication between a serving base station and the mobile station terminates, the serving base station currently handling communication with the mobile station.

7. The method of claim 1, wherein the calculating and sending steps are performed in response to the target base station having a greater connection strength with the mobile station than a current serving base station.

8. The method of claim 1, wherein the calculating and sending steps are performed in support of a hard handoff of the mobile station from the serving base station to the target base station.

9. The method of claim 1, wherein the wireless communications system operates in accordance with Universal Mobile Telecommunications System (UMTS).

10. A method of synchronizing a target base station with a mobile station in a wireless communications system, comprising:
    receiving, by an element on the network side, a signal indicating a propagation delay between the target base station and the mobile station, the propagation delay being calculated at least partially based on a first measured chip offset between a downlink channel of a serving base station and a pilot signal of the target base station and based on a second measured chip offset between an uplink channel of the mobile station and the pilot channel of the target base station; and synchronizing, by the element on the network side, with an uplink channel received from the mobile station based on the indicated propagation delay.

11. The method of claim 10, further comprising:

sending a signal indicating the second chip offset between the uplink channel of the mobile station and the pilot channel of the target base station, the received signal indicating the propagation delay also being based on the sent signal.

12. The method of claim 10, wherein the receiving step is performed before communication between the serving base station and the mobile station terminates, the serving base station currently handling communication with the mobile station.

13. The method of claim 10, wherein the synchronizing step includes:

determining an expected arrival time of a next transmission time interval (TTI) based on the propagation delay; and searching for uplink transmissions in a given proximity of the expected arrival time.

14. The method of claim 13, wherein the given proximity is determined based on an expectation of accuracy for the propagation delay.

15. The method of claim 13, wherein the given proximity accounts for drift in an actual propagation delay.

16. A method of calculating a propagation delay between a target base station and a mobile station in a wireless communications system, comprising:

first receiving, by an element on the network side, a first signal indicating a first measured chip offset between a downlink channel of a serving base station and a pilot signal of the target base station;

second receiving, by the element on the network side, a second signal indicating a second measured chip offset between an uplink channel of a the mobile station and a pilot signal of the target base station; and calculating, by the element on the network side, the propagation delay between the target base station and the mobile station based at least in part on the first and second measured chip offsets.

17. The method of claim 16, wherein the calculating step calculates the calculated propagation delay by subtracting the second measured chip offset and a constant value from the first measured chip offset and dividing the subtraction result by two.

18. The method of claim 17, wherein the first signal is received from the mobile station and the second signal is received from the target base station.

19. The method of claim 17, wherein the calculating step is performed at a radio network controller (RNC).

20. The method of claim 17, wherein the constant value is a set amount of time between a receipt of a downlink transmission and a start of an uplink transmission.

* * * * *